United States Patent [19]
Sofy

[11] 3,829,076
[45] Aug. 13, 1974

[54] DIAL INDEX MACHINE

[76] Inventor: Hugh M. Sofy, 201 Warrington, Bloomfield Hills, Mich. 48013

[22] Filed: June 8, 1972

[21] Appl. No.: 261,065

[52] U.S. Cl. .................................. 269/57, 269/66
[51] Int. Cl. .............................................. B23q 1/00
[58] Field of Search ............ 269/55, 56, 57, 58, 63, 269/66; 198/19; 51/240 T

[56] References Cited
UNITED STATES PATENTS

| | | | |
|---|---|---|---|
| 1,138,683 | 5/1915 | Murray | 51/240 T |
| 3,153,355 | 10/1964 | Opperthauser | 269/57 |
| 3,343,645 | 9/1967 | Doerfling | 269/57 |

Primary Examiner—Al Lawrence Smith
Assistant Examiner—Robert C. Watson
Attorney, Agent, or Firm—Harness, Dickey & Pierce

[57] ABSTRACT

A machine for indexing workpieces to a succession of work stations. A base supports a lightweight fabricated indexable work holding ring which supports workpieces outwardly and above the base. The work stations carried by the base are thus inside the ring, permitting easy accessibility to the ring. A cam drive mechanism is mounted outwardly of the base and under the ring. Piping and wiring may extend radially from the base center.

7 Claims, 7 Drawing Figures

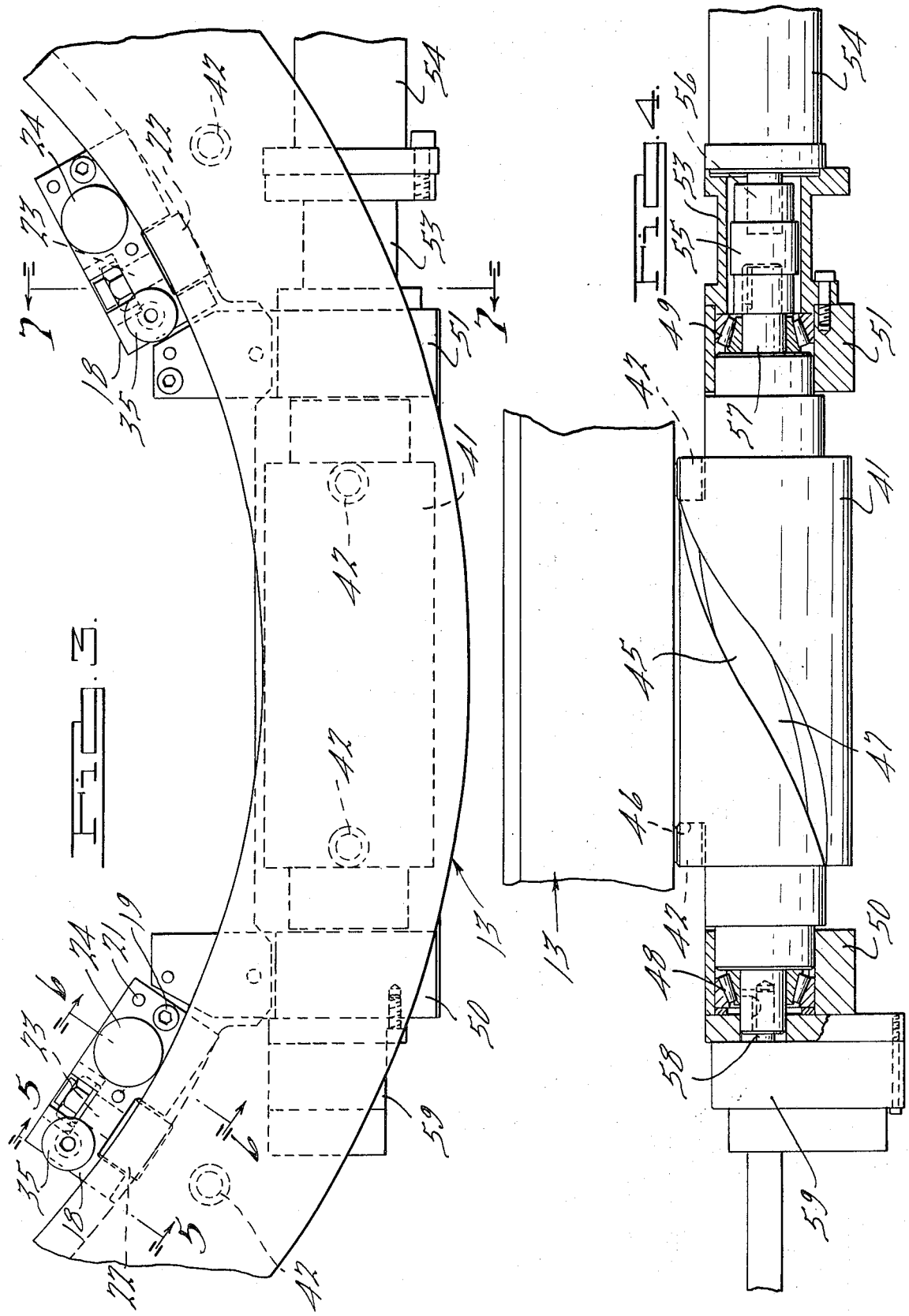

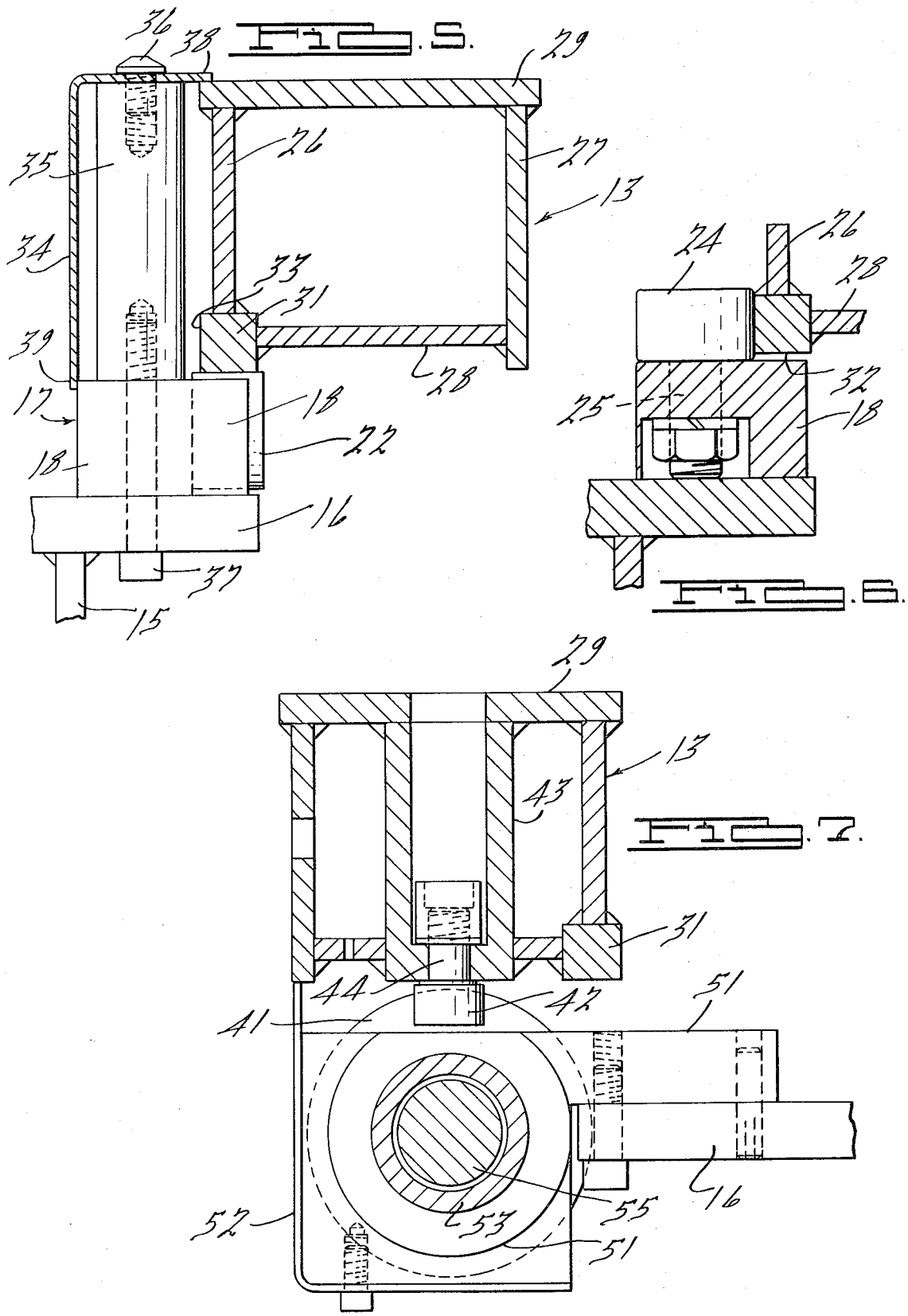

DIAL INDEX MACHINE

BACKGROUND OF THE INVENTION

1. Field of the Invention

The invention relates to machining or assembly operations in which workpieces are moved along a succession of stations. The invention is particularly concerned with high production assembly operations in which the work stations are circumferentially arranged and the workpieces indexed in succession to the stations.

2. Description of the Prior Art

Previous dial index machines of this nature have various drawbacks which it is a general object of the present invention to overcome. In some cases, the heavy weight of the moving parts restricts the rapidity with which the workpieces can be indexed. Often the tools at the work stations must be so mounted as to obstruct access to the stations for maintenance or tooling changes.

BRIEF SUMMARY OF THE INVENTION

It is an object of the invention to provide a novel and improved dial index machine which is simple and inexpensive to fabricate, and permits rapid indexing movement of the workpieces.

It is another object to provide a machine of this nature which may be fabricated of a relatively large diameter so as to accommodate more work stations, without detracting from the rapidity of movement.

It is also an object to provide a dial index machine in which the work station tools may be so mounted as to permit free access to the work stations.

It is a further object to provide an improved index machine of this character in which the drive mechanism has relatively low force requiremens for the indexing operation.

It is a further object to provide an index machine in which piping and wiring for the work stations may extend upwardly through the center of the base and then radially outwardly to the work stations.

BRIEF DESCRIPTION OF THE DRAWINGS

FIG. 3 is an enlarged fragmentary plan view of the work holding ring in the area of the drive cam;

FIG. 4 is a fragmentary elevational view of the cam and the adjacent portion of the ring showing the manner in which the ring is driven by the cam;

FIG. 5 is a cross-sectional view in elevation taken along the line 5—5 of FIG. 3 and showing the ring supporting rollers;

FIG. 6 is a fragmentary elevational view taken along the line 6—6 of FIG. 3 and showing one of the outer guide rollers for the ring; and FIG. 7 is a cross-sectional view in elevation taken along the line 7—7 of FIG. 3 and showing the manner in which the cam driven rollers are mounted on the ring.

DESCRIPTION OF THE PREFERRED EMBODIMENT

Figure 1:
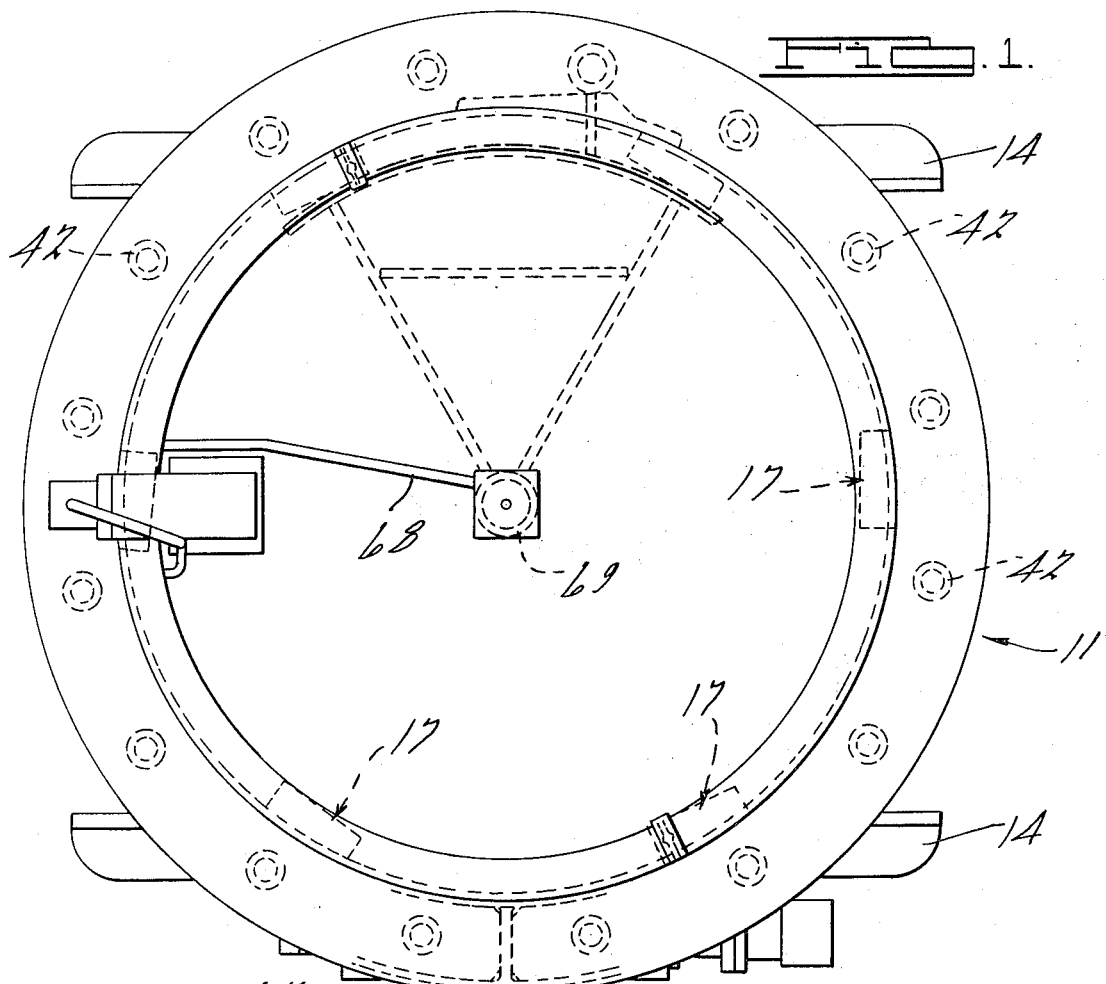
FIG. 1 is a top plan view of a dial index machine incorporating the principles of the invention.

The dial index machine is generally indicated at 11 and comprises a circular base generally indicated at 12 and an indexable work holding ring generally indicated at 13 rotatably supported by the base. Base 12 is of fabricated construction, having legs 14 and upright portions 15. An annular platform 16 (FIG. 5) surmounts and extends radially outwardly from portions 15 of the base. A plurality of guide roller assemblies generally indicated at 17 are mounted in circumferentially spaced relation on platform 16, as seen in FIG. 1. In order to provide additional contact points for ring 13 and prolong the life of the ring, the angular spacing of guide roller assemblies 17 is unequal.

Each guide roller assembly comprises a block 18 secured to platform 16 by bolts 19 and dowels 21. A crowned supporting roller 22 is rotatably mounted on each block 18 by a horizontal pivot pin 23 (FIG. 3). A radial guide roller 24 is mounted on block 18 adjacent roller 22 by means of a vertical pivot 25 (FIG. 6).

Work holding ring 13 is of lightweight, fabricated construction comprising inner and outer vertical cylindrical plates 26 and 27 respectively, a lower horizontal plate 28 and an upper workpiece supporting plate 29 (FIG. 5). These members together form a box section which is welded together, a roller engaging member 31 being welded at the intersection of members 26 and 28. This member is of square or rectangular cross-sectional shape as seen in FIGS. 5 and 6 so that its undersurface 32 rests on rollers 22 and its inwardly facing surface 33 engages rollers 24. Thus, work holding ring 13 is rotatably supported in a position above and outwardly from platform 16 of base 11.

An annular inner guard 34 of L-shaped cross section is mounted on guide roller assemblies 17. The means for mounting this guard comprises a post 35 mounted on each block 18, the upper portion of guard 34 being secured to these posts by fasteners 36 while the lower ends of the posts are secured to the blocks by fasteners 37. The upper and outer portion 38 of guard 34 will slightly overlap the inner edge of workpiece supporting plate 29, whereas the lower and inner portion 39 will overlap blocks 18.

The means for rotatably indexing ring 13 comprises a cylindrical drive cam 41 located below ring 13 and engageable with a plurality of cam driven rollers 42. These rollers are secured to the underside of ring 13 (FIG. 7) at equally spaced intervals by supports 43 and vertical pivots 44. Cam 41 has a grooved track 45 with alternate dwell portions 46 and advance travel portions 47 (FIG. 4) and rollers 42 will successively enter this groove as the cam is rotated. Cam 41 is rotatably supported by bearings 48 and 49 carried by bearing blocks 50 and 51 respectively secured to base 12. A cover guard 52 for cam 41 is mounted on bearing blocks 50 and 51. A motor block 53 secured to block 52 carries a hydraulic or air motor 54 coaxial with cam 41, a coupling 55 connecting the motor and cam shafts 56 and 57 respectively. The other end of cam shaft 57 is connected to the input shaft 58 of a rotary switch 59 which controls motor 54 so that cam 41 will stop each time the workpieces are advanced one station.

Figure 2:
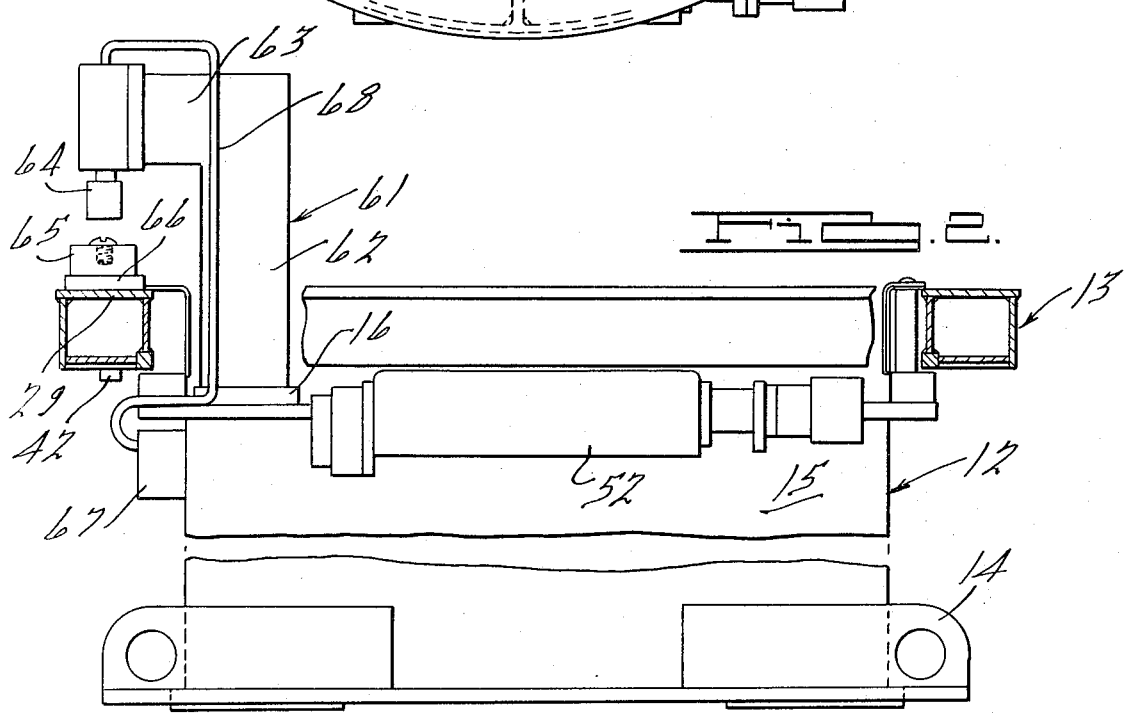
FIG. 2 is a partly sectioned and fragmentary elevational view of the machine showing one of the work stations.

FIG. 2 shows a typical work station generally indicated at 61. The station comprises an upright portion 62 mounted on platform 16 of base 12 and an outwardly extending portion 63 so that a tool 64 carried thereby will be disposed over a workpiece 65 carried by a fixture 66 on plate 29. Since work stations 61 are mounted inwardly of ring 13 there will be clear access to the machine from the outside for operating, maintenance and replacement purposes.

FIGS. 1 and 2 also illustrate the manner in which valves, piping and wiring may be installed in machine 11 in an efficient and convenient manner. Valves such as that indicated at 67 may be mounted on the periphery of base 12. Piping and wiring 68 may extend upwardly through a center post 69 within the base, radially outwardly beneath ring 13 to platform 16 of the base, and thence to the work stations.

In operation, motor 54 will rotate cam 41, the latter driving ring 13 through rollers 42 so that workpieces 65 will intermittently advance to the successive work stations 61. During this rotational movement, ring 13 will be supported and guided by rollers 22 and 24. Because of the light weight of ring 13, the indexing time may be very short, even when the ring is of large size. In a typical six-station 40-inch diameter machine, for example, it is possible to complete the index motion in one second; whereas large machines of comparable size, using heavy base castings and solid steel machined operating parts, require a minimum of 3 seconds.

I claim:

1. In a dial index machine, a fixed base having a fixed centrally disposed circular work station supporting platform, a work holding ring disposed above and at a peripheral portion of said platform, the platform having an unobstructed annular upwardly exposed surface inside said ring for the mounting of work stations, a plurality of circumferentially spaced antifriction guide assemblies mounted on said fixed base, said assemblies having antifriction means supporting and radially guiding said ring, drive means for rotatably indexing said ring, said drive means comprising a drivable member disposed beneath said ring and having dwell and travel movement portions, interengaging portions on said member and the underside of said ring, a motor for driving said drivable member, and a switch driven in synchronism with said drivable member for controlling the motor.

2. The combination according to claim 1, said ring being fabricated of a box cross section with inner and outer vertical members, an upper workpiece supporting plate and a lower member.

3. The combination according to claim 2, said work stations comprising members mounted uprightly on said base platform and extending outwardly over said ring.

4. The combination according to claim 3, further provided with wiring and piping for said work stations extending upwardly and outwardly from the center of said base, beneath said ring and to the top of said base platform.

5. The combination according to claim 2, said ring being further provided with a roller-engaging member of rectangular shape at the juncture of said inner and lower members, each of said guide assemblies comprising a supporting roller and a radial guide roller in contact with said roller engaging member.

6. The combination according to claim 2, the angular spacing of said guide assemblies being unequal.

7. The combination according to claim 1, said drivable member comprising a cylindrical cam disposed beneath said ring, said dwell and travel movement portions comprising a groove on said cam with dwell and travel portions, said interengaging means comprising a plurality of circumferentially spaced rollers extending downwardly from said ring and engageable with said cam.

* * * * *